United States Patent [19]

Schlobohm et al.

[11] Patent Number: 5,032,633

[45] Date of Patent: Jul. 16, 1991

[54] THERMOPLASTIC MOLDING COMPOSITIONS WITH HIGH COLD IMPACT STRENGTH

[75] Inventors: Michael Schlobohm, Marl; Franz-Josef Schlautmann, Haltern, both of Fed. Rep. of Germany

[73] Assignee: Huels Aktiengesellschaft, Marl, Fed. Rep. of Germany

[21] Appl. No.: 486,404

[22] Filed: Feb. 28, 1990

[30] Foreign Application Priority Data

Mar. 18, 1989 [DE] Fed. Rep. of Germany ....... 3908931

[51] Int. Cl.$^5$ .......................... C08K 5/43; C08L 77/06
[52] U.S. Cl. ..................................... 524/168; 524/158; 524/291; 524/606; 525/432
[58] Field of Search ............... 524/168, 158, 606, 291; 525/432

[56] References Cited

U.S. PATENT DOCUMENTS

| | | | |
|---|---|---|---|
| 2,214,405 | 9/1940 | Coffman | 524/168 |
| 3,182,100 | 5/1965 | Bedell | 524/168 |
| 4,689,364 | 8/1987 | Mumcu et al. | 524/606 |

FOREIGN PATENT DOCUMENTS

| | | |
|---|---|---|
| 53-17628 | 6/1978 | Japan . |
| 55-52364 | 4/1980 | Japan . |
| 1392949 | 5/1975 | United Kingdom . |

Primary Examiner—Veronica P. Hoke
Attorney, Agent, or Firm—Oblon, Spivak, McClelland, Maier & Neustadt

[57] ABSTRACT

Thermoplastic molding compositions that contain
(A) 10 to 90 parts by weight of polyamide 12, and 90 to 10 parts by weight of polyamide 10,12 and/or polyamide 12,12; and
(B) 0 to 25 wt. % of a plasticizer, exhibit improved low temperature impact strength. The molding compositions may be used for the production of molded objects, especially tubes.

19 Claims, No Drawings

THERMOPLASTIC MOLDING COMPOSITIONS WITH HIGH COLD IMPACT STRENGTH

BACKGROUND OF THE INVENTION

1. Field of the Invention

The present invention relates to thermoplastic molding compositions with high low temperature impact strength, molded articles prepared from such molding compositions, and a process for producing such molded articles.

2. Discussion of the Background

Industry places high requirements on the material properties of thermoplastic molding compositions, for example for conveyor pipe lines. With regard to the required quality, they must show inert behavior and must also remain stable in shape in the presence of thermal stress. For lines that are used outdoors, there is the requirement that such composition be able to withstand the effects of weather. Thus, such compositions must not lose their practical properties under the action of solar radiation, humidity, cold, etc.

All conventional polyamides (PA) are generally suitable for molded parts. However, especially for outdoor use, there are limitations to the utility of polyamides. Thus, there are no known industrially used polyamides that have at least one monomer with $\leq 10$ carbon atoms in the carbon chain that are not highly sensitive to water or atmospheric humidity. The sensitivity to humidity and water results in a sharp decrease of low temperature impact strength.

Polyamides with a larger number of carbon atoms in the carbon chain are more suitable, for example PA 11 or PA 12, since they show improved weathering stability and thus also improved low temperature impact strength. However, these higher polyamides, which are readily available industrially, suffer from the drawback that when plasticizers are used with them, the low temperature impact strength again decreases. The decrease in low temperature impact strength may be counteracted by the use of an impact strength modifier (see: DE-AS No. 27 16 004). With this approach, however, the rigidity and solvent resistance of the molding composition suffer.

PA 11 and PA 12 are used in the automobile sector in the plasticized form as fuel lines and as compressed air brake lines. An important requirement for such lines is that they must pass the pipe impact test according to the American Standard SAE J 844 d at $-40°$ C., with tubes with dimensions of $6.35 \times 1$ mm being considered to be particularly critical.

In this test, such tubes made of plasticized polyamides may break. The sensitivity of critical tube dimensions to mechanical stress is found to increase with higher extrusion rates, i.e., for example, it is pronounced at extrusion rates above 40 m/min.

Thus, there remains a need for molding compositions based on polyamides which do not exhibit a decrease in low temperature impact strength on exposure to moisture, molded articles produced from such molding compositions, and a process for preparing such molded articles.

SUMMARY OF THE INVENTION

Accordingly, it is an object of the present invention to provide molding compositions based on polyamides that possess good low temperature impact strength properties even when using plasticizers and under the action of weather, for example, humidity.

It is another object of the present invention to provide molded articles prepared from molding compositions based on polyamides that possess good low temperature impact strength properties even when using plasticizers and on exposure to weather.

It is another object of the present invention to provide a process for preparing molded articles from molding compositions based on polyamides that possess good low temperature impact strength properties even when using plasticizers and on exposure to weather.

These and other objects, which will become apparent during the course of the following detailed description, have been achieved by molding compositions which contain:

(A) 10 to 90 parts by weight of polyamide 12, and 90 to 10 parts by weight of polyamide 10,12 and/or polyamide 12,12, in which the polyamides have a relative solution viscosity ($\eta_{rel}$) in the range of 1.5 to 3.0, and the sum of the parts by weight is equal to 100; and (B) 0 to 25 wt. %, based on the weight of (A), of a plasticizer; and molded articles prepared by molding such molding compositions.

DETAILED DESCRIPTION OF THE PREFERRED EMBODIMENTS

Thus, in one embodiment the present invention relates to molding compositions containing a mixture of polyamide 12 with polyamide 10,12 and/or polyamide 12,12, in which the polyamides have a relative solution viscosity of 1.5 to 3.0 and which may also contain a plasticizer.

Preferred polyamides are those with a relative solution viscosity of 1.8 to 2.5.

Preferred mixture ratios of the polyamides are from 30 to 70 parts by weight of polyamide 12 and 70 to 30 parts by weight of polyamide 10,12 and/or polyamide 12,12.

The identification of the polyamides, in the present invention, as polyamide 10,12, polyamide 12,12, or polyamide 12 conforms to an international standard, with the first number(s) indicating the number of carbon atoms in the diamine starting material and the last number(s) indicating the number of carbon atoms in the dicarboxylic acid starting material. If only one number is indicated, this means that the polyamide is that derived from a starting material which is an aminocarboxylic acid or its lactam (see: H. Domininghaus, "*Die Kunststoffe und ihre Eigenschaften,*" VDI-Verlag 1976, p. 272).

Plasticizers and their use in polyamides are also well-known in the art, and any suitable plasticizer may be used in the present invention. A general review of plasticizers which are suitable for use in PA can be found in Gächter/Müller, *Kunststoffadditive*, C. Hanser Verlag, 2nd Edition, p. 296.

Examples of conventional compounds suitable as plasticizers are esters of p-hydroxybenzoic acid with 2 to 12 carbon atoms in the alcohol component, amides of arylsulfonic acids with 2 to 12 carbon atoms in the amine component, and preferably amides of benzenesulfonic acid.

Suitable plasticizers, among others, are ethyl p-hydroxybenzoate, octyl p-hydroxybenzoate, N-(n-butyl)toluenesulfonamide, N-(n-octyl)toluenesulfonamide, N-(n-butyl)benzenesulfonamide, and N-(2-ethylhexyl)benzenesulfonamide. A preferred plasticizer is N-(n-butyl)benzenesulfonamide.

It is preferred that the molding composition of the present invention contain 0 to 15 wt. % of plasticizer, based on the weight of the polyamides in each case.

The preparation of PA, such as PA 12,12 and PA 10,12, is well-known (see: R. Vieweg/A. Müller, *Kunststoffhandbuch*, Vol. 6-Polyamid, C. Hanser Verlag, Munich, 1966, p. 187; and Don. E. Floyd, *Polyamide Resins*, 2nd Edition, Chapman Hall, New York/London, 1966, pp. 55 ff.).

In addition to plasticizers, the molding compositions of to the present invention may also contain conventional auxiliary substances and additives such as stabilizers, pigments, fillers, reinforcing agents, or elastomers.

The molding compositions of the present invention may also be blended with other polyamides or polymers known for this purpose, provided that the desired properties pursuant to the invention are not impaired.

The molding compositions of the present invention may be prepared by any conventional method known in the art, for example by homogenizing the basic polyamides, plasticizers, optional auxiliaries and additives in a twin screw compounder, or diffusing the plasticizer, optionally together with auxiliaries and additives soluble in the plasticizer, into the solid mixture of the basic polyamides, or by mixing the plasticized base polymers as solids.

The molding compositions according to the present invention exhibit a number of unexpected good properties compared to other molding compositions based on PA known in the art. In comparison with PA with a smaller number of carbon atoms ($\leq 10$) in the starting monomers, molded parts are obtained according to the invention that retain their good properties even under the action of weathering, especially in the cold; this also applies in comparison with plasticized PA with a high number of carbon atoms or corresponding mixtures of PA 12 and PA 11. The present molding compositions also exhibit outstanding impact strength even at temperatures of about $-60°$ C.

The molding compositions can be processed by conventional processes such as injection molding, extrusion, or the like, to form molded articles. This is intended to include all molded articles, such as fibers, films, castings, hollow objects, profiles, and especially tubes.

Other features of the invention will become apparent in the course of the following descriptions of exemplary embodiments which are given for illustration of the invention and are not intended to be limiting thereof.

EXAMPLES

The parameters discussed in the Specification and in the Examples were determined by the following procedures.

The relative viscosity ($\eta_{rel.}$) of the PAs was determined in m-cresol (0.5 g PA in 100 cm$^3$ m-cresol) at 25° C. (DIN 53 727).

The low temperature impact strength of the molding compositions used in the Examples was measured for tubes with an outside diameter of 6.35 mm and a wall thickness of 1 mm. The tubes were produced on a 24-D single-screw extruder with BM screw (Maillefer Co.) with a melt temperature of 230° C. and a pulloff speed of 40 m/min.

One portion of the tubes is left untreated, a second portion is boiled for 2 hours in water, and a third portion is tempered in a heating furnace in air for 24 hours at 110° C. 10 of the tempered, boiled, or untreated tubes are subjected to a low temperature impact strength test according to SAE J 844 at $-40°$ C. The number of broken tubes is listed in Table 1 below.

In addition, the impact strength was determined on small standard test pieces according to DIN 53 453, the notched impact strength was also determined on small standard test pieces according to DIN 53 453 and on standard test pieces with double-V (DV) notches according to DIN 53 753, and also according to ASTM D 256 (Methods A and B).

The examples identified with letters are comparative examples not according to the present invention.

In all of the examples, "parts" means "parts by weight".

Preparation of PA 10,12 and PA 12,12

40.3 parts of 1,10-decanediamine (DA-10)/dodecanedioic acid (DDS) salt, or 42.8 parts 1,12-dodecanediamine (DA-12)/DDS salt (prepared from 17.23 parts DA-10 or 20.03 parts DA-12 and 23.03 parts DDS) and 0.05 parts DDS are placed in a pressure-resistant polycondensation reactor with an internal temperature of 160° C. The reactor is purged by applying vacuum and loading with nitrogen 5 times. To this mixture is added a mixture of 4 parts water and 0.01 part H$_3$PO$_4$ through a transfer lock, and the mixture is then heated to an internal temperature of 220° C. over a period of 120 minutes with stirring, with a pressure of 19 bar being reached. The pressure is then continuously relieved over a period of 90 minutes, and the contents of the reactor are heated to an internal temperature of 260° C. After the desired melt viscosity is reached, the stirrer is stopped, a nitrogen gauge pressure of 20 bar is set, and after a dwell time of 30 minutes the PA 10,12 ($\eta_{rel.}$=1.85) or PA 12,12 ($\eta_{rel.}$=1.89) is discharged using a spinning pump and is granulated in a water bath after cooling.

To adjust the of $\eta_{rel.}$ value to 2.15, the polyamides are postcondensed in the solid phase at 170° C.

Preparation of PA 12

The preparation is carried out as described in Example 5 of DE-OS 21 52 194. To reach the final n$_{rel.}$ value of 2.15, the PA 12 is postcondensed.

PA 11

The PA 11 used for comparison tests was a commercial type with an $\eta_{rel.}$ value of 2.18.

Preparation of the Molding Compositions 100 parts PA, 1 part N,N'-hexamethylenebis(3,5-di-t-butyl-4-hydroxy)dihydrocinnamamide as stabilizer, and the amounts of plasticizer or reinforcing agent listed in the tables are homogenized in a double-screw extruder, granulated, and dried to a residual moisture of <0.05 wt. %. N-(n-butyl)benzenesulfonamide (BBSA) is used as plasticizer.

EXAMPLES 1–6

COMPARATIVE EXAMPLES A–D

The impact strength of tubes prepared from the molding compositions listed in Table 1 were measured. The results given in Table 1 show that the molding compositions of the present invention pass the tube impact test according to SAE J 844 d even at −60° C. in comparison with those known from the art.

EXAMPLES 7 AND 8

COMPARATIVE EXAMPLES E-G

The impact strength of articles prepared from the molding compositions listed in Table 2 were measured. The results given in Table 2 show that the molding compositions of the present invention exhibit improved impact strength even in the absence of plasticizers; see Table 2.

EXAMPLES 9 AND 10

COMPARATIVE EXAMPLES H AND I

The properties of the reinforced molding compositions shown in Table 3 were measured. It is seen from the results given in Table 3 that the reinforced molding compositions of the present invention possess improved impact strength as compared to PA 12.

Obviously, numerous modifications and variations of the present invention are possible in light of the above teachings. It is therefore to be understood that within the scope of the appended claims, the invention may be practiced otherwise than as specifically described herein.

TABLE 1

Tube impact tests according to SAE J 844 d. The number of broken tubes is indicated.

| | EXAMPLES | | | | | |
|---|---|---|---|---|---|---|
| | 1 | 2 | 3 | 4 | 5 | 6 |
| Composition (parts) | 70 PA 12<br>30 PA 10,12<br>14 BBSA<br>1 Stabil. | 50 PA 12<br>50 PA 12,12<br>14 BBSA<br>1 Stabil. | 30 PA 12<br>70 PA 10,12<br>14 BBSA<br>1 Stabil. | 70 PA 12<br>30 PA 12,12<br>14 BBSA<br>1 Stabil. | 50 PA 12<br>50 PA 12,12<br>14 BBSA<br>1 Stabil. | 55 PA 12<br>45 PA 10,12<br>7.5 BBSA<br>1 Stabil. |
| Test at −40° C.: | | | | | | |
| (1) as extruded | 0 | 0 | 0 | 0 | 0 | 0 |
| (2) after tempering | 0 | 0 | 0 | 0 | 0 | 0 |
| (3) after boiling | 0 | 0 | 0 | 0 | 0 | 0 |
| Tested at −60° C.: | | | | | | |
| (1) as extruded | 6 | 1 | 4 | 5 | 0 | 0 |
| (2) after tempering | 0 | 0 | 1 | 0 | 0 | 0 |
| (3) after boiling | 0 | 0 | 0 | 0 | 0 | 0 |

| | | Comparative Examples | | | |
|---|---|---|---|---|---|
| | | A | B | C | D |
| | Composition (parts) | 100 PA 11<br>14 BBSA<br>1 Stabil. | 100 PA 12<br>14 BBSA<br>1 Stabil. | 70 PA 12<br>30 PA 11<br>14 BBSA<br>1 Stabil. | 100 PA 10,12<br>14 BBSA<br>1 Stabil. |
| | Tested at −40° C.: | | | | |
| | (1) as extruded | 0 | 8 | 10 | 0 |
| | (2) after tempering | 2 | 9 | 10 | 0 |
| | (3) after boiling | 0 | 7 | 6 | 0 |
| | Tested at −60° C.: | | | | |
| | (1) as extruded | 10 | 10 | 10 | 5 |
| | (2) after tempering | 8 | 10 | 10 | 3 |
| | (3) after boiling | 5 | 10 | 10 | 0 |

TABLE 2

Notched impact strengths of unplasticized molding compositions.

| | | Comparative Examples | | | Examples | |
|---|---|---|---|---|---|---|
| | | E | F | G | 7 | 8 |
| Composition (parts) | | 100 PA 12<br>1 Stabil. | 100 PA 11<br>1 Stabil. | 100 PA 10,12<br>1 Stabil. | 55 PA 12<br>45 PA 10,12<br>1 Stabil. | 55 PA 12<br>45 PA 12,12<br>1 Stabil. |
| Notched impact strength [kJ/m²] | | | | | | |
| DIN 53 453: at 23° C. | | 29.6(7/11 n.b.)[a] | n.b. | n.b. | n.b. | n.b. |
| at 0° C. | | 8.7 | 56.1(6/10 n.b.) | 29.0(4/11 n.b.) | n.b. | n.b. |
| at −20° C. | | 7.7 | 17.1 | 14.5 | 25(10/11 n.b.) | n.b. |
| at −40° C. | | 8.3 | 13.1 | 11.5 | 18(7/11 n.b.) | 21(8/11 n.b.) |
| DV notched impact strength [kJ/m²] | | | | | | |
| DIN 53 753: at 23° C. | | n.b. | n.b. | n.b. | n.b. | n.b. |
| at 0° C. | | 21.8 | 118(5/10 n.b.) | 98.9(9/11 n.b.) | n.b. | n.b. |
| at −20° C. | | 21.4 | 79.5 | 65.1 | n.b. | n.b. |
| at −40° C. | | 24 | 55.8 | 57.5 | n.b. | n.b. |

[a]n.b. = not broken; number in parentheses is the number of articles broken per the number tested.

TABLE 3

Impact Strengths of reinforced molding compositions.

| Composition (parts) | H<br>100 PA 12<br>20 Fiberglass<br>1 Stabil. | Examples<br>9<br>55 PA 12<br>45 PA 10,12<br>20 Fiberglass<br>1 Stabil. | I<br>100 PA 12<br>32 Fiberglass<br>0.5 Stabil.<br>0.1 Nigrosine | 10<br>55 PA 12<br>45 PA 10,12<br>32 Fiberglass<br>0.5 Stabil.<br>0.1 Nigrosine |
|---|---|---|---|---|
| Impact strength [kJ/m$^2$] | | | | |
| DIN 53 453: at 23° C. | 63 | 66 | 59 | 66 |
| at 0° C. | 54 | 55 | 55 | 65 |
| at −20° C. | 56 | 58 | 58 | 67 |
| at −40° C. | 56 | 59 | 59 | 66 |
| Notched impact strength [kJ/m$^2$] | | | | |
| DIN 53 453: at 23° C. | 20 | 22 | 24 | 31 |
| at 0° C. | 16 | 18 | 21 | 26 |
| at −20° C. | 14 | 17 | 19 | 24 |
| at −40° C. | 13 | 16 | 19 | 21 |
| DV-notched impact strength [kJ/m$^2$] | | | | |
| DIN 53 753: at 23° C. | 26 | 31 | 30 | 37 |
| at 0° C. | 21 | 27 | 24 | 34 |
| at −20° C. | 22 | 27 | 25 | 33 |
| at −40° C. | 22 | 28 | 26 | 33 |
| Notched impact strength ASTM D 256 [J/m] | | | | |
| Method A at 23° C. | 200 | 206 | 220 | 290 |
| at 0° C. | 127 | 136 | 161 | 212 |
| Method B at 23° C. | 220 | 246 | 273 | 330 |
| at 0° C. | 152 | 166 | 218 | 251 |

What is claimed as new and desired to be secured by letters patent of the United States is:

1. A thermoplastic molding composition, comprising:
   (A) 10 to 90 parts by weight of polyamide 12, and 90 to 10 parts by weight of at least one member selected from the group consisting of polyamide 10,12 and polyamide 12,12, wherein the relative solution viscosity ($\eta_{rel.}$) of said polyamides is in the range of 1.5 to 3.0, and the sum of the parts by weight is equal to 100; and
   (B) 0 to 25 wt. %, based on the weight of (A), of a plasticizer.

2. The molding composition of claim 1, wherein said plasticizer is present in an amount of 0 to 15 wt. %.

3. The molding composition of claim 1, wherein said plasticizer is N-(n-butyl)benzenesulfonamide.

4. The molding composition of claim 1, wherein said polyamides have a relative solution viscosity in the range of 1.8 to 2.5.

5. The molding composition of claim 1, wherein in (A) said polyamide 12 is present in an amount of 30 to 70 parts by weight and said member selected from the group consisting of polyamide 10,12 and 12,12 is present in an amount of 70 to 30 parts by weight.

6. A molded article, prepared from a molding composition, comprising:
   (A) 10 to 90 parts by weight of polyamide 12, and 90 to 10 parts by weight of at least one member selected from the group consisting of polyamide 10,12 and polyamide 12,12, wherein the relative solution viscosity ($\eta_{rel.}$) of said polyamides is in the range of 1.5 to 3.0, and the sum of the parts by weight is equal to 100; and
   (B) 0 to 25 wt. %, based on the weight of (A), of a plasticizer.

7. The molded article of claim 6, wherein said plasticizer is present in an amount of 0 to 15 wt. %.

8. The molded article of claim 6 wherein said plasticizer is N-(n-butyl)benzenesulfonamide.

9. The molded article of claim 6, wherein said polyamides have a relative solution viscosity in the range of 1.8 to 2.5.

10. The molded article of claim 6, wherein in (A) said polyamide 12 is present in an amount of 30 to 70 parts by weight and said member selected from the group consisting of polyamide 10,12 and 12,12 is present in an amount of 70 to 30 parts by weight.

11. The molded article of claim 6, which is in the form of a tube.

12. A process for producing a molded article, comprising molding a molding composition comprising:
   (A) 10 to 90 parts by weight of polyamide 12, and 90 to 10 parts by weight of at least one member selected from the group consisting of polyamide 10,12 and polyamide 12,12, wherein the relative solution viscosity ($\eta_{rel.}$) of said polyamides is in the range of 1.5 to 3.0, and the sum of the parts by weight is equal to 100; and
   (B) 0 to 25 wt. %, based on the weight of (A), of a plasticizer.

13. The process of claim 12, wherein in said molding composition, said plasticizer is present in an amount of 0 to 15 wt. %.

14. The process of claim 12, wherein said plasticizer is N-(n-butyl)benzenesulfonamide.

15. The process of claim 12, wherein said polyamides have a relative solution viscosity in the range of 1.8 to 2.5.

16. The process of claim 12, wherein in (A) said polyamide 12 is present in an amount of 30 to 70 parts by weight and said member selected from the group consisting of polyamide 10,12 and 12,12 is present in an amount of 70 to 30 parts by weight.

17. The process of claim 12, wherein said molding is carried out by injection molding.

18. The process of claim 12, wherein said molding is carried out by extrusion.

19. The process of claim 12, wherein said molded article is in the form of a tube.

* * * * *